US008810519B2

(12) United States Patent
Valentine et al.

(10) Patent No.: US 8,810,519 B2
(45) Date of Patent: Aug. 19, 2014

(54) TOUCH SENSOR INTEGRATED WITH A KEYBOARD SPACEBAR

(75) Inventors: Mark F. Valentine, Kenosha, WI (US); David B. Cranfill, Allen, TX (US); Michael F. Olley, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 240 days.

(21) Appl. No.: 13/561,376

(22) Filed: Jul. 30, 2012

(65) Prior Publication Data

US 2014/0028564 A1 Jan. 30, 2014

(51) Int. Cl.
*G06F 3/02* (2006.01)

(52) U.S. Cl.
USPC ........................................................ 345/168

(58) Field of Classification Search
CPC ..................................... G06F 3/04; G06F 3/02
USPC .......................... 345/168, 160, 172, 173, 661
See application file for complete search history.

(56) References Cited

U.S. PATENT DOCUMENTS

| | | | | |
|---|---|---|---|---|
| 5,681,220 A * | 10/1997 | Bertram et al. | ................. | 463/37 |
| 5,841,423 A * | 11/1998 | Carroll et al. | ................. | 345/168 |
| 6,501,462 B1 * | 12/2002 | Garner | ......................... | 345/173 |
| 7,659,887 B2 | 2/2010 | Larsen et al. | | |
| 8,035,623 B2 | 10/2011 | Bruwer | | |
| 2008/0316176 A1 * | 12/2008 | Deutsch et al. | ............... | 345/168 |
| 2009/0146960 A1 * | 6/2009 | Gim | .............................. | 345/172 |
| 2010/0026626 A1 * | 2/2010 | Macfarlane | ................... | 345/160 |
| 2010/0245395 A1 * | 9/2010 | LeBert et al. | ................. | 345/661 |
| 2012/0306752 A1 * | 12/2012 | Hosoya et al. | ................ | 345/168 |

* cited by examiner

*Primary Examiner* — Fred Tzeng
(74) *Attorney, Agent, or Firm* — Shumaker & Sieffert, P.A.

(57) ABSTRACT

A touch sensor integrated with a keyboard spacebar. A touchpad zone can be defined on a portion of a planar surface of a spacebar. The touchpad zone can be configured to detect movement of a human appendage across the touchpad zone, or above the touchpad zone, and generate a corresponding signal from the keyboard that causes corresponding movement of a cursor presented on a display. In another embodiment, a touchpad can be positioned over the spacebar. The touchpad can be slidably engaged to the keyboard to facilitate user positioning of the touchpad over a desired portion of the spacebar.

29 Claims, 8 Drawing Sheets

1600

Detect at least one location corresponding to a touchpad zone defining structure with respect to the space bar, the spacebar configured to receive a user input depressing the spacebar to generate a corresponding first signal from the keyboard.
1602

Based on the at least one location, define the touchpad zone to be a portion of a planar surface of the spacebar, a surface area of the portion of the planar surface being less than a surface area of an entirety of the planar surface of the spacebar, the touchpad zone configured to detect movement of a human appendage across the touchpad zone, or above the touchpad zone, and generate a corresponding second signal from the keyboard that causes corresponding movement of a cursor presented on a display.
1604

Deactivate touch or gesture sensing capability of the spacebar in regions outside of the touchpad zone.
1606

FIG. 16

TOUCH SENSOR INTEGRATED WITH A KEYBOARD SPACEBAR

BACKGROUND OF THE INVENTION

A touchpad, sometimes referred to as a trackpad, is a pointing device commonly used on laptop computers as a substitute for a mouse. A touchpad features a planar surface that translates the position and motion of a user's finger to a relative position and motion on a display. The planar surface can operate using a variety of technologies, for example using capacitive sensing or conductance sensing. Oftentimes one or more buttons are positioned proximate to the touchpad to receive user inputs, commonly referred to as "right click," "left click" and "double click," to select objects, launch menus, and initiate other programmatic actions. Sometimes, such programmatic actions can be initiated in response to finger taps being detected on the planar surface.

BRIEF DESCRIPTION OF THE DRAWINGS

FIG. 16 is a flowchart depicting a method of generating touchpad and key selection signals, which is useful for understanding various arrangements described herein.

DETAILED DESCRIPTION

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Arrangements described herein relate to integration of a touchpad with a keyboard spacebar. In one arrangement, a touchpad can be integrated with a spacebar having a planar surface on an upper side of the spacebar. A touchpad zone can be defined on a portion of the planar surface. The touchpad zone can be configured to detect movement of a human appendage across the touchpad zone, or above the touchpad zone (e.g., a gesture), and generate a corresponding signal from the keyboard that causes corresponding movement of a cursor presented on a display. A surface area of the touchpad zone can be less than a surface area of an entirety of the planar surface. Movement of an appendage across, or above, the planar surface outside the touchpad zone is not detected to generate the corresponding signal. The area of the planar surface on which the touchpad zone is defined can be user selectable.

In another embodiment, a touchpad can be positioned over a spacebar. The touchpad can be configured to slidably engage to the keyboard to facilitate user positioning of the touchpad over a desired portion of the spacebar. The touchpad can be configured to detect movement of a human appendage across the touchpad or above the touchpad, and generate a corresponding signal from the keyboard that causes corresponding movement of a cursor presented on a display.

Figure 1:
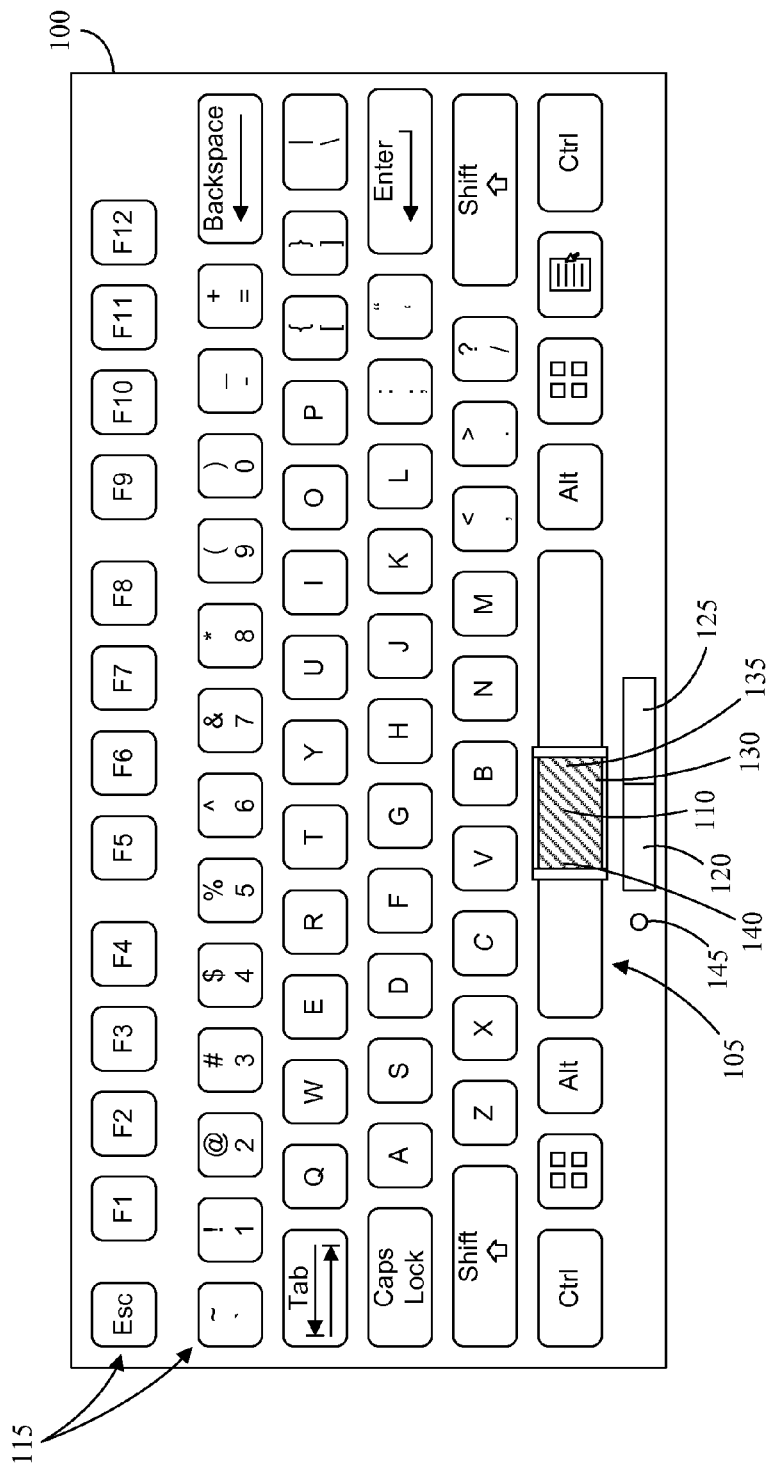
FIG. 1 depicts a keyboard including a spacebar on which a touchpad zone is defined, which is useful for understanding various arrangements described herein.

FIG. 1 depicts a keyboard 100 including a spacebar 105 on which a touchpad zone 110 is defined, which is useful for understanding various arrangements described herein. The touchpad zone 110 can be configured to detect movement of a human appendage (e.g., a finger) across the touchpad zone 110, or above the touchpad zone 110, and generate a corresponding signal from the keyboard that causes corresponding movement of a cursor presented on a display.

The keyboard 100 can be any keyboard that includes a spacebar 105, for example a conventional keyboard in a QWERTY or Dvorak layout. In this regard, the keyboard can comprise a plurality of keys 115, as is known in the art. The keyboard 100 further can include a keypad (not shown), cursor movement keys (i.e., arrow keys) (not shown), and/or any number of other keys.

As used herein, the term "spacebar" means a key on a keyboard in the form of a horizontal bar in a lower row (e.g., lowermost row) of keys of the keyboard that is significantly wider than the other keys of the keyboard. The keyboard is configured to generate a signal corresponding to a space that follows or precedes a character/symbol (or another space) in response to an event in which the spacebar 105 is depressed, for instance in a conventional manner. The keyboard can generate other signals that correspond to the spacebar 105 being depressed while another key (e.g., modifier key) is depressed.

In one arrangement, the touchpad zone 110 can be activated responsive to a user selection of a particular key of the keyboard or a particular user gesture. Further, an indicator 145, such as a light (e.g., a light emitting diode (LED)), can be integrated into the keyboard 100 to indicate whether the touchpad zone 110 is active. In lieu of, or in addition to, such indicator 145, a message can be provided by a processing system to which the keyboard 100 is attached to indicate whether the touchpad zone 110 is active. For instance, the processing system can present a word balloon or other suitable indicator onto a display.

When touching the touchpad zone 110, a user sometimes may touch with sufficient pressure to depress the spacebar 105, while such touch is not intended by the user to be interpreted as a spacebar depress event. To disambiguate a user intended spacebar depress event from a touch in the touchpad zone 110 that incidentally depresses the spacebar 105, thus generating an unintended spacebar depress event, a processor, such as a keyboard processor (also referred to as a "keyboard controller"), can receive signals corresponding to user touches in the touchpad zone 110, and signals corresponding to spacebar depress events (e.g., when the processor polls the keys of the keyboard). While signals are received indicating that the user is touching the spacebar 105 in the touchpad zone 110, the processor can ignore spacebar depress events, yet still process signals corresponding to touches in the touchpad zone 110. Signals corresponding to spacebar depress events generated when the user is not touching the spacebar 105 in the touchpad zone 110 can be processed in a normal manner. The processor can be integrated into the spacebar 105, elsewhere in the keyboard 100, or in a system to which the keyboard 100 is communicatively linked.

Optionally, the keyboard 100 can include one or more buttons 120, 125 to receive user inputs (e.g., left click and right click and double click) to select objects, launch menus, and initiate other programmatic actions. In addition to, or in lieu of, the buttons 120, 125, such user inputs can be received by the touchpad zone 110, for example as finger taps. In illustration, a single finger tap in the touchpad zone 110 (or a particular region of the touchpad zone 110) can be interpreted as a left click, and two sequential finger taps can be interpreted as a double click. A single finger tap in a particular region of the touchpad zone 110, for example in a lower region 130, can be interpreted as a right click. Further, one or more scroll zones can be defined in the touchpad zone 110. For example, a left/right scroll region can be defined in the lower region 130, and an up/down scroll region can be defined in a rightmost region 135 or a leftmost region 140 of the touchpad zone 110.

Figure 2:
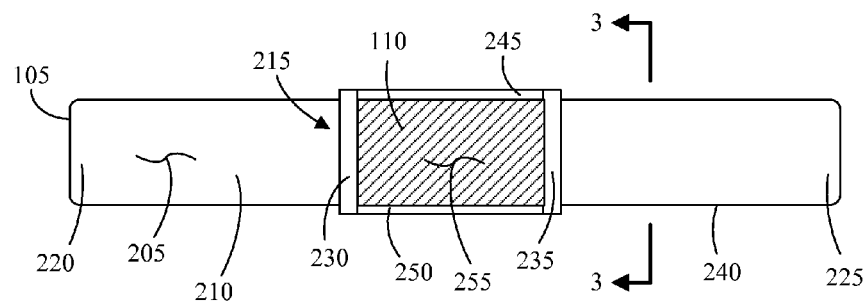
FIG. 2 is an enlarged view of the spacebar of FIG. 1 in accordance with one arrangement described herein.

FIG. 2 is an enlarged view of the spacebar 105 of FIG. 1 in accordance with one embodiment described herein. The spacebar 105 can include a planar surface 205 on an upper side of the spacebar 105 (i.e., the side of the spacebar configured to receive a user input to depress the spacebar). The planar surface 205 can comprise flat and/or contoured portions (e.g., portions that are convex in shape, portions that are concave in shape, and/or portions having sophisticated contours). A touch sensor 210 can be disposed on, within and/or under the planar surface 205. The touch sensor 210 can receive power and communicate signals via wires connected to a key switch configured to detect when the spacebar 105 is depressed, or via any other suitable wires or cables.

The touch sensor 210 can detect touches of an appendage on the touch sensor 210, movement of an appendage across the touch sensor 210, and/or movement of an appendage above the touch sensor 210 (e.g., gesture recognition), and generate corresponding signals. The touch sensor 210 can operate using any of a variety of touch sensing and/or gesture recognition technologies, for example using capacitive sensing or conductance sensing. In illustration, in one arrangement, the touch sensor 210 can be configured to sense a change in capacitance between a transmitter and a receiver disposed on opposite sides of the touch sensor 210 when an appendage (e.g., a finger) touches or is proximate to the touch sensor 210. This arrangement commonly is referred to in the art as the "capacitive shunt method."

In another arrangement, the touch sensor 210 can be configured to operate using a series of conductors arranged in an array of parallel lines in two layers, separated by an insulator, and crossing each other at right angles to form a grid. A high frequency signal can be applied sequentially between pairs of conductors in this two-dimensional grid array. The current that passes between the nodes is proportional to the capacitance. When a virtual ground, such as a human appendage, is placed over one of the intersections between the conductive layer (e.g., either touching the touch sensor 210 or positioned above the touch sensor 210), some of the electrical field is shunted to this ground point, resulting in a change in the apparent capacitance at that location. This arrangement commonly is known in the art as the "matrix approach." Still, other methods and structures for detecting an appendage touching or being proximate to a touch sensor are known to those skilled in the art and within the scope of the present embodiments.

The touchpad zone 110 can be defined by a touchpad zone defining structure (hereinafter "structure") 215 disposed proximate to the planar surface 205 of the spacebar 105. Specifically, the structure 215 can define a portion of the planar surface 205 as the touchpad zone 110. The structure 215 can slidably engage the keyboard. For example, the structure 215 can slidably engage the spacebar 105, as will be described in further detail. A user can move (e.g., slide) the structure 215 to any location on the spacebar 105, thus enabling the user to position the touchpad zone 110 to a desired location on the spacebar 105. For example, the user can slide the structure 215 to a left side 220 of the spacebar 105, to a right side 225 of the spacebar 105, or anywhere between the left side 220 and the right side 225.

In illustration, if the user typically uses their right thumb to depress the spacebar 105 while typing, the user may choose to position the structure 215 in the middle of the spacebar 105, on the left side 220 of the spacebar 105, on the right side 225 of the spacebar 105, or anywhere in between. If, however, the user typically uses their left thumb to depress the spacebar 105 while typing, the user may choose to position the structure 215 in the middle of the spacebar 105, on the right side 225 of the spacebar, or anywhere in between. Accordingly, the structure 215 need not interfere with the user's finger or fingers while the user is typing.

The structure 215 can include a left fence 230 substantially perpendicular to a long side 240 of the spacebar 105 and a right fence 235 also substantially perpendicular to the long side 240 of the spacebar 105. The left and right fences 230, 235 can define the region of the spacebar 105 that is to be recognized as the touchpad zone 110. Specifically, the keyboard 100 can detect the respective locations of the left and right fences 230, 235 with respect to the spacebar 105, and identify the touchpad zone 110 as being a portion of the planar surface 205 having a left side defined by the left fence 230 and a right side defined by the right fence 235.

Optionally, one or more cross members 245, 250 can connect the left fence 230 to the right fence 235 to provide a fixed distance between the left and right fences 230, 235. In an arrangement in which the spacebar is curved, the cross members 245, 250 can be hingedly attached to the left and right fences 230, 235, thus allowing the structure 215 to freely slide on the curved spacebar. In another arrangement, the cross members 245, 250 need not be provided. Accordingly, the user can move the left and right fences 230, 235 individually, thus allowing the user to not only select where on the spacebar 105 the touchpad zone 110 is defined, but also to select a width of the touchpad zone 110.

A touch cover 255 extending between the left and right fences 230, 235 can be disposed over the touchpad zone 110, for instance in an arrangement in which the left and right fences 230, 235 are separated by a fixed distance. The touch cover 255 can be formed of a plastic or film through which user touches are detected by the touch sensor 210. The touch cover 255 can be selected to have a particular dielectric constant to facilitate sensing of touches or gestures through the touch cover 255. Graphics can be disposed on the touch cover 255 to indicate various regions of the touchpad zone 110, for example an up/down scroll region, a left/right scroll region, regions of the touchpad zone 110 where a touch is interpreted as a left click or right click, and so on.

Figure 3:
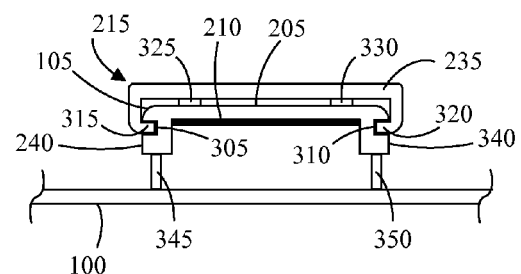
FIG. 3 depicts an enlarged section view of one embodiment of the spacebar of FIG. 2 taken along section line 3-3.

FIG. 3 is an enlarged section view of one embodiment of the spacebar 105 of FIG. 2 taken along section line 3-3. The spacebar 105 can include a channel 305 defined on the long side 240 of the spacebar 105 and a channel 310 defined on a long side 340 of the spacebar 105. The channels 305, 310 can be configured to slidably engage respective tabs 315, 320 of the structure 215, for example tabs on the right fence 235. The channels 305, 310 also can be configured to slidably engage respective tabs (not shown) on the left fence 230. The channels 305, 310 can maintain the position of the structure 215 on the spacebar 105, while allowing the user to slide the structure 215 along the channels 305, 310 to a desired location on the spacebar 105.

The structure also can include locating pads 325, 330 attached to the right fence 235 and disposed between the right fence 235 and the planar surface 205. Similarly, locating pads (not shown) can be attached to the left fence 230 and disposed between the left fence 230 and the planar surface 205. In this regard, the locating pads can be considered to be components of the respective fences 230, 235. The locating pads 325, 330 each can include a friction layer that provides sufficient friction between the locating pads 325, 330 and the planar surface 205 to hold the structure 215 in place when positioned by the user.

Each of the locating pads 325, 330 further can include a conductor, such as a conductive layer positioned above the friction layer, that is sensed by the touch sensor 210. Accordingly, the touch sensor 210 can sense the respective locations of the locating pads 325, 330 on the spacebar 105 and, based on these locations, the processor can define the touchpad zone 110.

Figure 4:
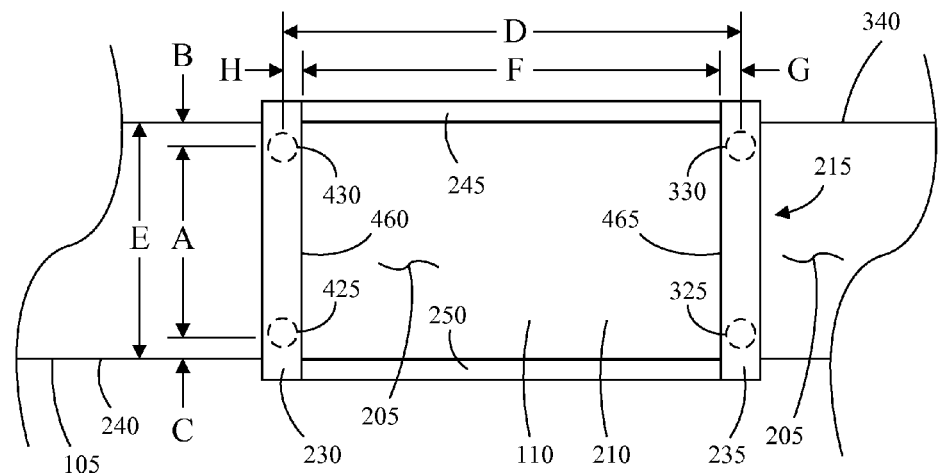
FIG. 4 is an enlarged view of a touchpad zone defining structure attached to the spacebar of FIG. 2 in accordance with one arrangement described herein.

In illustration, FIG. 4 depicts a view of the structure 215 attached to the spacebar 105 of FIG. 2, and the locating pads 325, 330 disposed between the right fence 235 and the planar surface 205. In addition, FIG. 4 depicts locating pads 425, 430 disposed between the left fence 230 and the planar surface 205.

To distinguish the locating pads 325, 330, 425, 430 from an appendage (e.g., a finger), the processor can be configured to identify the locations of the locating pads 325, 330, 425, 430 based on one or more signals received from the touch sensor 210, and identify various distances between the respective locating pads 325, 330, 425, 430 and or distances between the respective locating pads 325, 330, 425, 430 and the sides 240, 340 of the spacebar. For example, the processor can identify the distance A between the locating pads 325, 330 and/or the distance A between the locating pads 425, 430. The processor also can identify the distance B between the locating pads 330, 430 and the side 340 and/or the distance C between the locating pads 325, 425 and the side 240. In an arrangement in which the cross member 245 and/or the cross member 250 are provided, the processor also can identify the distance D between the locating pads 325, 330 and the locating pads 425, 430. Based on one or more of these distances, the processor can identify that corresponding signal(s) received from the touch sensor are associated with the locating pads 325, 330, 425, 430, and thus determine the corresponding signals identify the respective locations of the locating pads 325, 330, 425, 430 on the spacebar 105. Tolerances for the respective distances can be set to mitigate risk of falsely detecting finger touches as locating pads 325, 330, 425, 430.

Based on the respective locations of the locating pads 325, 330, 425, 430, the processor can define the touchpad zone 110. For example, the processor can define the touchpad zone 110 as extending a distance E between the sides 240, 340 of the spacebar 105, which can be known to the processor a priori, thus defining bottom and top sides of the touchpad zone 110. Further, the processor can define the touchpad zone 110 as extending a distance F between the right side 460 of the left fence 230 and the left side 465 of the right fence 235. Accordingly, the sides 460, 465 can define respective left and right sides of the touchpad zone 110.

The processor can determine the location of the sides 460, 465 based on a known distance G between the locating pads 325, 330 and the side 465 and a known distance H between the locating pads 425, 430 and the side 460. In an arrangement in which the cross member 245 and/or the cross member 250 are provided, the distance F may be fixed. Accordingly, the processor need only know the distance G and the location of the locating pad 325 or the locating pad 330 to define the touchpad zone 110 as extending the distance F from the location of the left side 465 of the right fence 235, or need only know the distance H and the location of the locating pad 425 or the locating pad 430 to define the touchpad zone 110 as extending the distance F from the location of the right side 460 of the left fence 230.

When the processor defines the touchpad zone 110, the processor can activate touch and/or gesture sensing capability in the touchpad zone 110 and deactivate touch and/or gesture sensing capability on the spacebar 105 in regions outside of the touchpad zone 110. For example, the processor can be configured to only process signals from the touchpad sensor 210 corresponding to touches or gestures detected by the touchpad sensor 210 in the touchpad zone 110, and ignore signals from the touchpad sensor 210 corresponding to touches or gestures detected by the touchpad sensor 210 outside of the touchpad zone 110. A suitable filtering algorithm can be executed the processor to implement such functionality.

Referring again to FIG. 3, the keyboard 100 can include one or more actuators 345, 350 that prevent the spacebar 105 from moving into a depressed position when the user touches the spacebar 105 in the touchpad zone 110, while allowing the spacebar 105 to move into the depressed position when the user touches the spacebar outside of the touchpad zone 110. The actuators 345, 350 can be any suitable mechanical, electromechanical, electrostatic or magnetic mechanisms suitable to perform such function. Actuators are known to those skilled in the art. The actuators 345, 350 can be controlled via a processor or controller configured to detect when a user touches the touchpad zone 110 with an appendage, and detect when the user is not touching the touchpad zone 110.

For example, the actuators 345, 350 can comprise pins that protrude from the keyboard 100 to prevent the spacebar 105 from moving into a depressed position when the user touches the spacebar in the touchpad zone 110, and retract into the keyboard 100 to allow the spacebar 105 to move into the depressed position when the user touches the spacebar outside of the touchpad zone 110. The pins may protrude vertically from a bottom of the keyboard 100, or any other suitable structure of the keyboard 100. For example, the pins can protrude horizontally or diagonally from another suitable structure of the keyboard. One or more springs (not shown), can return the spacebar 105 to the default, un-depressed, position when the user releases the spacebar 105.

Figure 5:
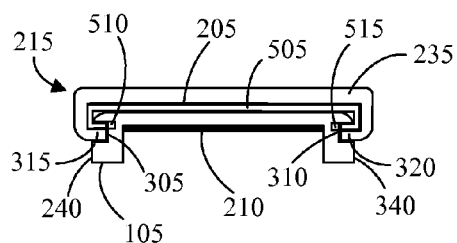
FIG. 5 depicts an enlarged section view of another embodiment of the spacebar of FIG. 2 taken along section line 3-3.

FIG. 5 is an enlarged section view of another embodiment of the spacebar of FIG. 2 taken along section line 3-3. This arrangement is similar to the arrangement described with respect to FIG. 3, but in lieu of, or in addition to, the locating pads 325, 330, the structure 215 can include a locating bar 505 attached to the right fence 235 and disposed between the right fence 235 and the planar surface 205. Similarly, a locating bar (not shown) can be attached to the left fence 230 and disposed between the left fence 230 and the planar surface 205. In this regard, the locating bars can be considered to be components of the respective fences 230, 235. The locating bars 505 each can include a friction layer that provides sufficient friction between the locating bars 505 and the planar surface 205 to hold the structure 215 in place when positioned by the user.

Each of the locating bars 505 further can include a conductor, such as a conductive layer. By way of example, in one arrangement, the touch sensor 210 can detect the locating bars 505 and generate corresponding signals to a processor indicating the location of the locating bars 505, and thus the respective fences. In another arrangement, the locating bars 505 can be detected by touchpad zone location sensors (hereinafter "sensors") 510, 515, which may be proximate to the channels 305, 310. In illustration, each locating bar 505 can close an electrical connection between specific portions of the respective sensors 510, 515, thus indicating the locations of the locating bars 505.

In this regard, the sensors 510, 515 can include respective contacts that engage the locating bars 505. For example, each of the sensors 510, 515 can include a plurality of such contacts. When the right fence 235 is positioned in a particular location on the spacebar 105, the locating bar can close an electrical connection between one or more contacts of the sensor 510 and one or more contacts of the sensor 515, and such contacts can be identified by a processor communicatively linked to the sensors 510, 515. Based on the identification of the contacts, the processor can determine the location of the locating bar 505, and thus the location of the right fence 235. The location of the left fence (not shown in FIG. 5), can be determined in a similar manner. Based on these locations, the processor can define the touchpad zone.

Figure 6:
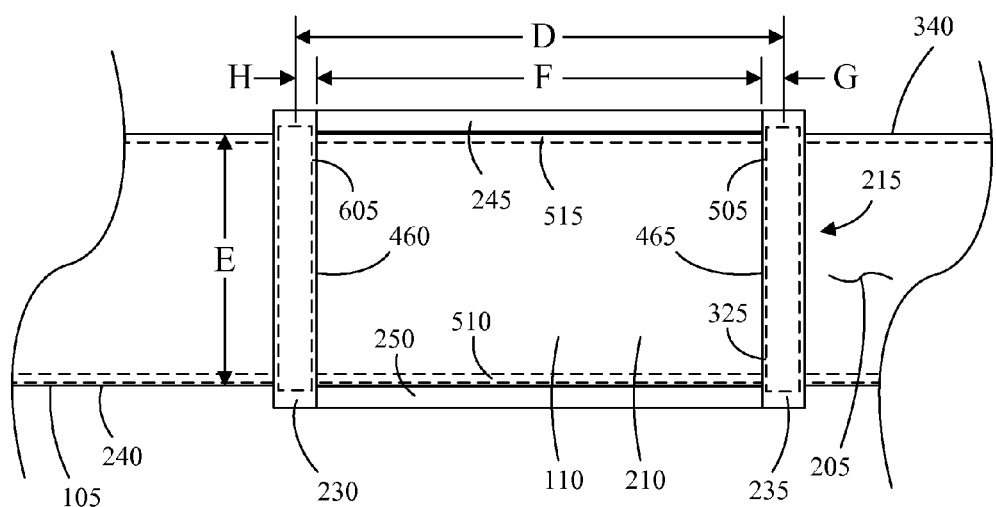
FIG. 6 is an enlarged view of a touchpad zone defining structure attached to the spacebar of FIG. 2 in accordance with one arrangement described herein.

FIG. 6 is an enlarged view of the structure 215 attached to the spacebar 105 of FIG. 2 in accordance with one embodiment described herein. This arrangement is similar to the arrangement described with respect to FIG. 4, but in lieu of, or in addition to, the locating pads 325, 330, 425, 430, the structure 215 can include the locating bar 505 attached to the right fence 235 and a locating bar 610 attached to the left fence 230. The locating bar 605 can be disposed between the left fence 230 and the planar surface 205 and, as noted, the locating bar 505 can be disposed between the right fence 235 and the planar surface 205.

In the arrangement in which the respective locations of the locating bars 505, 605 are detected by the touch sensor 210, the processor can be configured to recognize at least one dimension of the locating bars 505, 605, which will be different than a dimension of a portion of a user's finger, and based on the dimension(s) identify corresponding signals generated by the touch sensor 210 as corresponding to the locating bars 505, 605. In the arrangement in which the respective locations of the locating bars 505, 605 are detected by the sensors 510, 515, the processor can be configured to recognize signals generated by the sensors 510, 515 (e.g., the flow of current through specific contacts of the sensors) as corresponding to the locating bars 505, 605.

Based on the respective locations of the locating bars 505, 605, the processor can define the touchpad zone 110. As noted, the processor can define the touchpad zone 110 as extending a distance E between the sides 240, 340 of the spacebar 105, thus defining bottom and top sides of the touchpad zone 110. Further, the processor can define the touchpad zone 110 as extending a distance F between the right side 460 of the left fence 230 and the left side 465 of the right fence 235. Accordingly, the sides 460, 465 can define respective left and right sides of the touchpad zone 110.

The processor can determine the location of the sides 460, 465 based on a known distance G between the locating bar 505 and the side 465 and a known distance H between the locating bar 605 and the side 460. In an arrangement in which the cross member 245 and/or the cross member 250 are provided, the distance F may be fixed. Accordingly, the processor need only know the distance G and the location of the locating bar 505 to define the touchpad zone 110 as extending the distance F from the location of the left side 465 of the right fence 235, or need only know the distance H and the location of the locating bar 605 to define the touchpad zone 110 as extending the distance F from the location of the right side 460 of the left fence 230. As noted, when the processor defines the touchpad zone 110, the processor can activate touch and/or gesture sensing capability in the touchpad zone 110 and deactivate touch and/or gesture sensing capability on the spacebar 105 in regions outside of the touchpad zone 110, for example as previously described.

Figure 7:
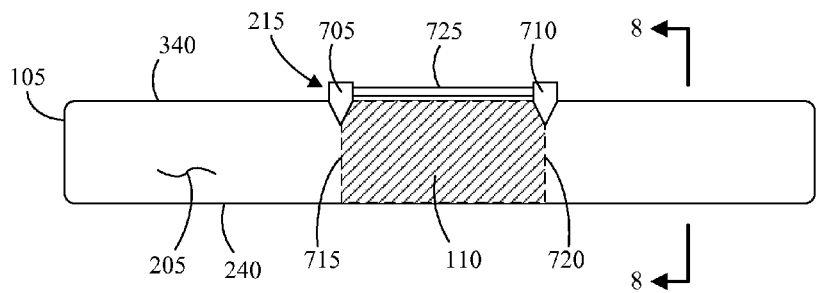
FIG. 7 is an enlarged view of the spacebar of FIG. 1 in accordance with another arrangement described herein.

FIG. 7 is an enlarged view of the spacebar 105 of FIG. 1 in accordance with another embodiment described herein. In lieu of the left and right fences, the structure can include a left marker 705 and a right marker 710 that define the region of the spacebar 105 that is to be recognized as the touchpad zone 110. Specifically, the keyboard 100 can detect the respective locations of the left and right markers 705, 710 with respect to the spacebar 105, and identify the touchpad zone 110 as being a portion of the planar surface 205 having a left side 715 defined by the left marker 705 and a right side 720 defined by the right marker 710. Further, the touchpad zone 110 can extend from the side 240 of the spacebar 105 to the side 340, thus defining bottom and top sides of the touchpad zone 110. As noted, when the processor defines the touchpad zone 110, the processor can activate touch and/or gesture sensing capability in the touchpad zone 110 and deactivate touch and/or gesture sensing capability on the spacebar 105 outside of the touchpad zone 110.

Optionally, a cross member 725 can connect the left marker 705 to the right marker 710 to provide a fixed distance between the left and right markers 705, 710. In an arrangement in which the spacebar is curved, the cross member 725 can be hingedly attached to the left and right markers 705, 710, thus allowing the structure 215 to freely slide on the curved spacebar. In another arrangement, the cross member 725 need not be provided. Accordingly, the user can move the left and right markers 705, 710 individually, thus allowing the user to not only select where on the spacebar 105 the touchpad zone 110 is defined, but also to select a width of the touchpad zone 110.

Figure 8:
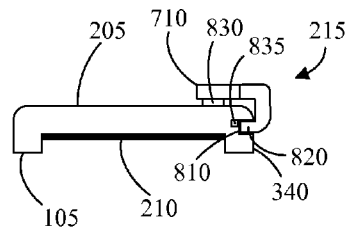
FIG. 8 is an enlarged section view of the spacebar of FIG. 7 taken along section line 8-8.

FIG. 8 is an enlarged section view of the spacebar 105 of FIG. 7 taken along section line 8-8. The spacebar 105 can include a channel 810 defined on the long side 340 of the spacebar 105. The channel 810 can be configured to slidably engage a tab 820 of the structure 215, for example a tab on the right marker 710. The channel 810 also can be configured to slidably engage a tab (not shown) on the left marker 705. The channel 810 can maintain the position of the structure 215 on the spacebar 105, while allowing the user to slide the structure 215 (or individual markers) along the channel 810 to a desired location.

In one arrangement, a locating pad 830 can be disposed between the right marker 710 and the planar surface 205. Similarly, a locating pad (not shown) can be disposed between the left marker 705 and the planar surface 205. Collectively, both locating pads will be referred to as locating pads 830. The locating pads 830 can be configured as described in FIGS. 3 and 4 with respect to the locating pads 325, 330, 425, 430. Identification of the locating pads and their respective locations can be determined in a manner similar to that described, for example using the touch sensor 210 to identify that the locating pads 830 are positioned a particular distance from the side 340 of the spacebar 105 (although the distances A and C depicted in FIG. 4 would not be detected).

In another arrangement, in lieu of using the locating pads 830 to determine the location of the respective markers 705, 710, a touchpad zone location sensor (hereinafter "sensor") 835 can be provided in the spacebar 105, for example proximate to the channel 810, to detect such locations by sensing proximity of the markers 705, 710 to the sensors.

Figure 9:
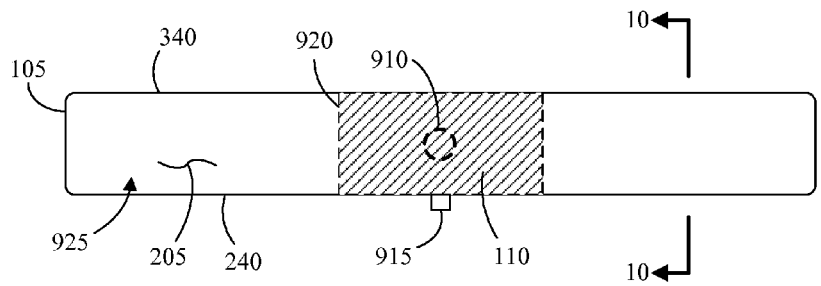
FIG. 9 is an enlarged view of the spacebar of FIG. 1 in accordance with another arrangement described herein.

FIG. 9 is an enlarged view of the spacebar 105 of FIG. 1 in accordance with another arrangement described herein. In this arrangement, the spacebar 105 can include an optical navigation module 910 disposed under the planar surface 205 of the spacebar 105. The planar surface 205 of the spacebar 105 can comprise a material that is transparent to infrared (IR) light. In one arrangement, such material can be opaque to visible light. In other arrangements, the material can be partially opaque to visible light, or transparent to visible light.

The optical navigation module 910 can include an IR transmitter and an IR detector. The IR transmitter can transmit IR light through the planar surface 205 of the spacebar 105, and the IR detector can detect scattering of light off of a user appendage (e.g., a user's finger) on or above the touchpad zone 110 to detect position and movement of the appendage. Data generated by the IR detector can be filtered is a suitable manner to limit appendage detection to the touchpad zone 110. In one arrangement, the IR detector can be an IR photo diode, or any other suitable detector that detects electromagnetic energy (e.g., light) in the IR band.

Further, the optical navigation module 910 can include one or more visible light transmitters, such as light emitting diodes (LEDs), that project at least one image onto the spacebar 105, visible to the user, which designates a perimeter 920 of the touchpad zone 110. Further, the image can provide visible light across the entire touchpad zone 110 and/or denote button or slider regions of the touchpad zone 110. In another arrangement, the optical navigation module 910 can include at least one light guide illuminated by a light source, such as an LED, that indicates the touchpad zone 110, for example by designating the perimeter 920 of the touchpad zone with visible light, providing visible light in the touchpad zone 110 and/or denote button or slider regions of the touchpad zone 110. In this regard, the spacebar 105 can be partially opaque to visible light, but provide sufficient diffraction of visible light emitting from the planar surface 205 for the user to view the visible light on the spacebar denoting the perimeter 920 and/or illuminating the region of the touchpad zone 110.

In a further arrangement, the visible light transmitters and/or light guide(s) can provide alerts or status indications by illuminating one or more portions of the touchpad zone 110 with visible light. By way of example, the status indications can indicate two-finger gestures, left/right button presses, or proximity detection modes.

A positioner 915 can be attached to the optical navigation module 910 to enable a user to position the optical navigation module 910 to a desired portion of the spacebar 105. For example, the positioner 915 can extend beyond the side 240 or the side 340 of the spacebar 105 and be configured to be moved by the user in order for the user to select where on the spacebar 105 the touchpad zone is to be located.

Figure 10:
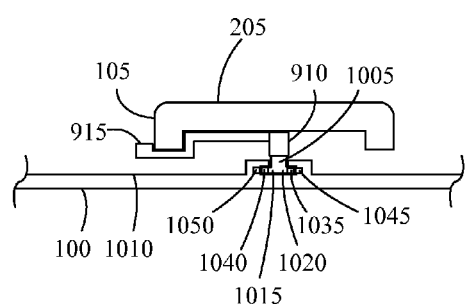
FIG. 10 is an enlarged section view of the spacebar of FIG. 9 taken along section line 10-10.

FIG. 10 is an enlarged section view of the spacebar of FIG. 9 taken along section line 10-10. The optical navigation module 910 can comprise a post 1005 that slidably engage a surface 1010 of the keyboard 100. In illustration, the post 1005 can include a tab 1015 that slidably engages a channel 1020 defined in the keyboard 100. Again, one or more friction pads can be attached to the optical navigation module 910 and disposed between the optical navigation module 910 and the planar surface 205 of the spacebar 105 to hold the optical navigation module 910 in place when positioned by the user. In another arrangement, friction pads can be provided between the tab 1015 and in the channel 1020.

Contacts 1035, 1040 can be located on the tab 1015 and contacts 1045, 1050 can be located in the channel 1020. The contacts 1045, 1050 can be configured to engage the respective contacts 1035, 1040. The contacts 1045, 1050 can extend the entire length of the channel 1020, or a substantial portion thereof. Accordingly, the contacts 1035, 1040, 1045, 1050 can provide electrical connections between the optical navigation module 910 and the processor over which signals can be communicated between the optical navigation module 910 and the processor, and to provide power to the optical navigation module 910, regardless of where the optical navigation module 910 is located over the spacebar 105. Further, via the contacts 1035-1050, electrical power can be provided to the optical navigation module 910. In another arrangement, a flex cable (not shown) can be provided to provide electrical connections between the optical navigation module 910 and the processor over which signals generated by the optical navigation module 910 can be communicated, and to provide power to the optical navigation module 910.

Referring again to FIG. 9, in lieu of using the light transmitter and/or light guide(s) to denote the touchpad zone 110, provide alerts, etc., the optical navigation module 910 can include a bistable display 925 that presents an image of the touchpad zone 110 on the spacebar 105. Such displays are well known to those of ordinary skill in the art. In illustration, the bistable display 925 can be attached to, or integrated within, the planar surface 205 of the spacebar 105 and extend entire width of the spacebar 105. A processor or controller can be provided to direct the bistable display 925 to determine where the touchpad zone 110 is presented on the spacebar. The bistable display can maintain an image on the spacebar indicating the location of the touchpad zone 110 until the touchpad zone 110 is intentionally moved, even while the keyboard otherwise is inactive. In other words, the bistable display 925 only needs power to change an image, but can maintain the image while powered off. One example of a suitable bistable display technology is electrophoretic ink (e-ink). Another example is a cholesteric liquid crystal display (ChLCD). Another is a bistable segmented display, which can apply voltage to a region of the display to cause the region to change color until voltage again is applied. Still, other bistable display technologies are known in the art and within the scope of the present arrangements.

In one non-limiting arrangement, the bistable display 925 can be used by the user in lieu of the positioner 915 to change the location of the touchpad zone 110 on the spacebar 105. For example, the user can select a particular key on the keyboard, or provide a certain gesture or a certain type of touch or touches in the touchpad zone 110, which indicates that the user desires to move the touchpad zone. The user then can move the touchpad zone 110 to any desired location on the spacebar 105 by touching a region of the touchpad zone 110 and sliding the touchpad zone 110 to the desired location. A suitable processor or controller can be included in the keyboard to receive the user inputs from suitable sensing devices, such as those described herein, and implement such processes.

Figure 11:
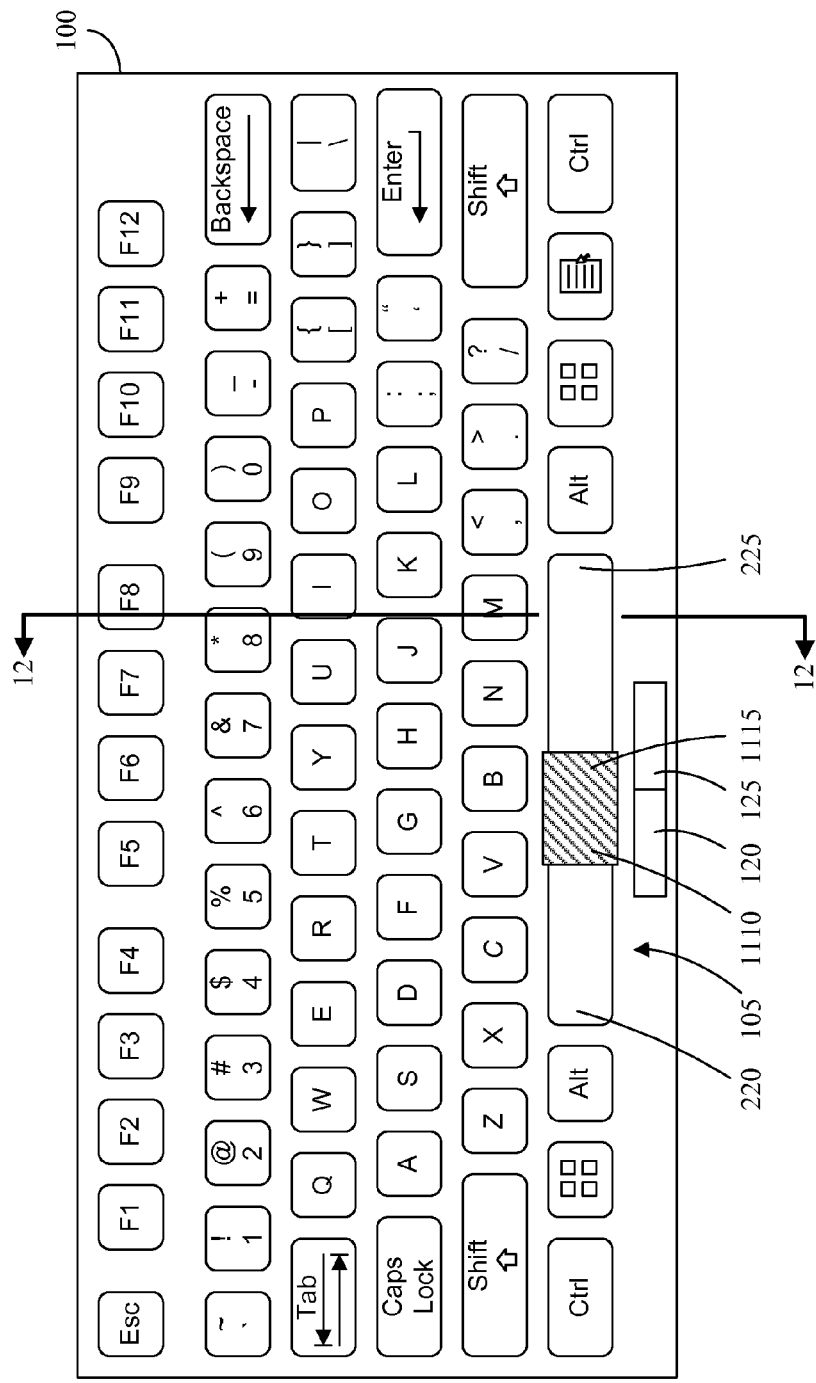
FIG. 11 depicts a keyboard including a spacebar over which a touchpad is positioned, which is useful for understanding another arrangement described herein.

FIG. 11 depicts another arrangement of the keyboard 100 of FIG. 1. In this arrangement, in lieu of defining the touchpad zone 110 (FIG. 1) on the spacebar 105, a touchpad 1110 can be positioned over the spacebar. Further, the touchpad 1110 can be slidably engaged to the keyboard (e.g., slidably engaged to the spacebar 105 or another keyboard structure) to facilitate user positioning of the touchpad over a desired location of the spacebar 105. For example, the user can slide the touchpad 1110 to the left side 220 of the spacebar 105, to the right side 225 of the spacebar 105, or anywhere between the left side 220 and the right side 225.

The touchpad 1110 can include a touch sensor 1115 configured to detect touches of an appendage on the touch sensor 1115, movement of an appendage across the touch sensor 1115, and/or movement of an appendage above the touch sensor 1115, and generate corresponding signals. The touch sensor 1115 can operate using any of a variety of touch sensing and/or gesture recognition technologies, for example those previously described.

The touchpad 1110 can be communicatively linked to a processor that processes signals generated by the touchpad 1110 in any suitable manner. For example, in one arrangement, a flex cable can be provided to connect the touchpad 1110 to the processor, while not interfering with movement of the touchpad 1110 along the spacebar 105. In another arrangement, contacts can be provided along a length of the spacebar 105 to slidably engage contacts on the touchpad 1110, regardless of where the touchpad 1110 is positioned over the spacebar 105. The spacebar 105 contacts can be communicatively linked to the processor in a suitable manner. Further, the touchpad 1110 can include a dedicated processor configured to process touch events and generate a corresponding serial formatted signal. Accordingly, the number of conductors in the flex cable or the number of contacts required to communicate signals from the touchpad 1110 to the other processor can be minimized (e.g., a signal wire/contact and a return or ground wire/contact).

When touching the touchpad 1110, a user sometimes may touch with sufficient pressure to depress the spacebar 105, while such touch is not intended by the user to be interpreted as a spacebar depress event. To disambiguate a user intended spacebar depress event from a touch on the touchpad 1110 that incidentally depresses the spacebar 105, thus generating an unintended spacebar depress event, the processor can receive signals corresponding to user touches on the touchpad 1110 and spacebar depress events. While such signals indicate that the user is touching the touchpad 1110, the processor can ignore spacebar depress events and process signals corresponding to touches on the touchpad 1110. Signals corresponding to spacebar depress events generated when the user is not touching the touchpad 1110 can be processed in a normal manner.

As noted, buttons 120, 125 can be provided to select user inputs (e.g., left click and right click and double click) to select objects, launch menus, and initiate other programmatic actions, though this is not a requirement. For example, in lieu of the buttons 120, 125, such user inputs can be received by the touchpad 1110, for example as previously described with respect to the touchpad zone 110 receiving such user inputs.

Figure 12:
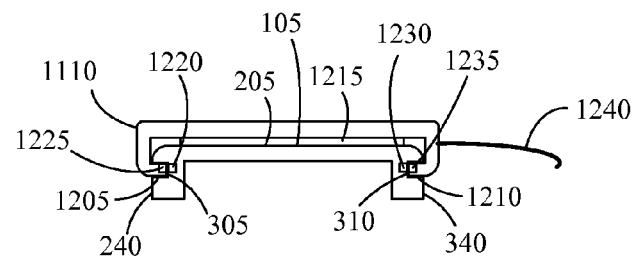
FIG. 12 is an enlarged section view of the spacebar of FIG. 11 taken along section line 12-12.

FIG. 12 is an enlarged section view of the spacebar 105 of FIG. 11 taken along section line 12-12. The spacebar 105 can be configured as described with respect to FIG. 3, sans the touchpad sensor and locating pads. In this regard, the spacebar 105 can include the channels 305, 310 defined on respective sides 240, 340 of the spacebar 105. The channels 305, 310 can be configured to slidably engage respective tabs 1205, 1210 of the touchpad 1110. The channels 305, 310 can maintain the position of the touchpad 1110 on the spacebar 105, while allowing the user to slide the touchpad 1110 along the channels 305, 310 to a desired location. One or more friction pads 1215 can be disposed between the touchpad 1110 and the planar surface 205 of the spacebar 105 to hold the touchpad 1110 in place when positioned by the user.

In an arrangement in which contacts are used to communicatively link the touchpad 1110 to a processor, a contact 1220 can be provided to engage a contact 1225 on the tab 1205, and a contact 1230 can be provided to engage a contact 1235 on the tab 1210. The contacts 1225, 1235 can extend the entire length of the spacebar 105, or a substantial portion thereof, along the respective sides 240, 340. Accordingly, the contacts 1220-1235 can provide electrical connections between the touchpad 1110 and the processor over which signals generated by the touchpad 1110 can be communicated, regardless of where the touchpad 1110 is over on the spacebar 105. Further, via the contacts 1220-1235, electrical power can be provided to the touchpad 1110. In another arrangement, a flex cable 1240 can be provided to provide electrical connections between the touchpad 1110 and the processor over which signals generated by the touchpad 1110 can be communicated, and to provide power to the touchpad 1110.

Figure 13:
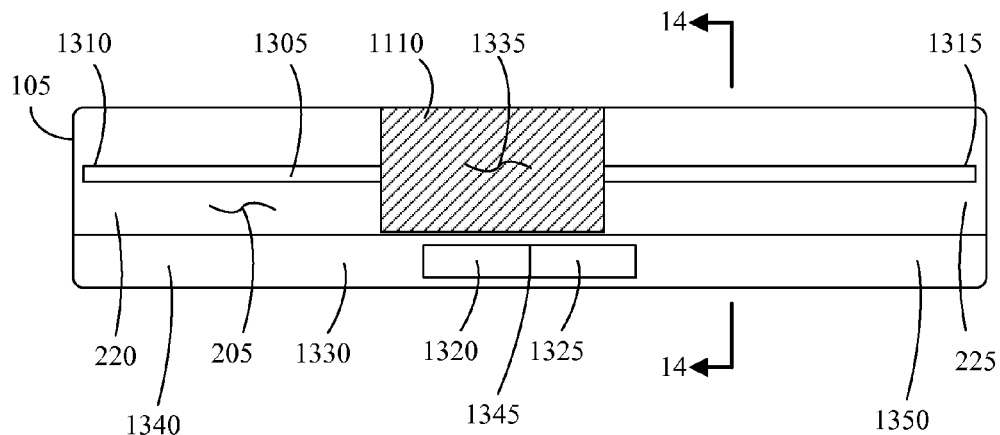
FIG. 13 is an enlarged view of another embodiment of the spacebar of FIG. 11.

FIG. 13 is an enlarged view of another embodiment of the spacebar 105 of FIG. 11. In this arrangement, a slot 1305 can be defined in the spacebar 105 through which the touchpad 1110 slidably engages the keyboard. The slot 1305 can extend along the planar surface 205 of the spacebar from a region 1310 proximate to the left side 220 of the spacebar 105 to a region 1315 proximate to the right side 225 of the spacebar 105, thus facilitating positioning of the touchpad 1110 at a desired location over the spacebar 105.

Optionally, in lieu of the buttons 120, 125 depicted in FIG. 11, buttons 1320, 1325 can be integrated with the spacebar 105. The buttons 1320, 1325 can receive user inputs as previously described with respect to the buttons 120, 125. The spacebar 105 can include a raised portion, or shelf, 1330 on which the buttons 1320, 1325 are disposed. The shelf can be configured to be approximately a same height above the planar surface 205 as a surface 1335 of the touchpad.

In one aspect of the present arrangements, the buttons 1320, 1325 can be virtual buttons presented on the spacebar 105 defined on the raised portion 1330 in lieu of physical buttons. As used herein, the term "virtual button" means an object defined for a particular region in which a user touch or gesture detected in the region is interpreted as a user selection of the object.

In this arrangement, the position of the touchpad 1110 with respect to the spacebar 105 can be identified, and the buttons 1320, 1325, can be defined on the spacebar 105 to be in a region of the raised portion 1330 that is proximate to the touchpad 1110. In illustration, if the touchpad 1110 is positioned over a left side 220 of the spacebar 105, the buttons 1320, 1325 can be defined at a left side 1340 of the raised portion 1330. If the touchpad 1110 is positioned over a middle of the spacebar 105, the buttons 1320, 1325 can be defined at a middle portion 1345 of the raised portion 1330. If the touchpad 1110 is positioned over a right side of the spacebar 105, the buttons 1320, 1325 can be defined at a right portion 1350 of the raised portion 1330. Still, the virtual buttons 1320, 1325 can be presented in any other portion of the raised portion 1330 of the spacebar 105 proximate to the touchpad 1110.

Figure 14:
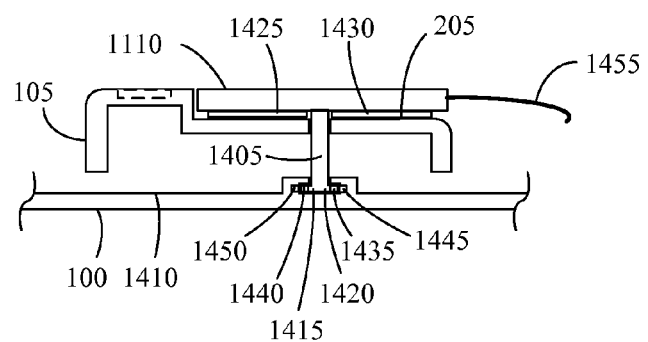
FIG. 14 is an enlarged section view of the spacebar of FIG. 13 taken along section line 14-14.

FIG. 14 is an enlarged section view of the spacebar of FIG. 13 taken along section line 14-14. The touchpad 1110 can comprise one or more posts 1405 that slidably engage a surface 1410 of the keyboard 100. In illustration, the post 1405 can include a tab 1415 that slidably engages a channel 1420 defined in the keyboard 100. Again, one or more friction pads 1425, 1430 can be attached to the touchpad 1110 and disposed between the touchpad 1110 and the planar surface 205 of the spacebar 105 to hold the touchpad 1110 in place when positioned by the user. In another arrangement, friction pads can be provided between the tab 1415 and in the channel 1420.

Contacts 1435, 1440 can be located on the tab 1415 and contacts 1445, 1450 can be located in the channel 1420. The contacts 1445, 1450 can be configured to engage the respective contacts 1435, 1440. The contacts 1445, 1450 can extend the entire length of the channel 1420, or a substantial portion thereof. Accordingly, the contacts 1435, 1440, 1445, 1450 can provide electrical connections between the touchpad 1110 and the processor over which signals generated by the optical touchpad 1110 can be communicated, and to provide power to the touchpad 1110, regardless of where the touchpad 1110 is located over the spacebar 105. Further, via the contacts 1435-1450, electrical power can be provided to the touchpad 1110. In another arrangement, a flex cable 1455 can be provided to provide electrical connections between the touchpad 1110 and the processor over which signals generated by the touchpad 1110 can be communicated, and to provide power to the touchpad 1110.

Figure 15:
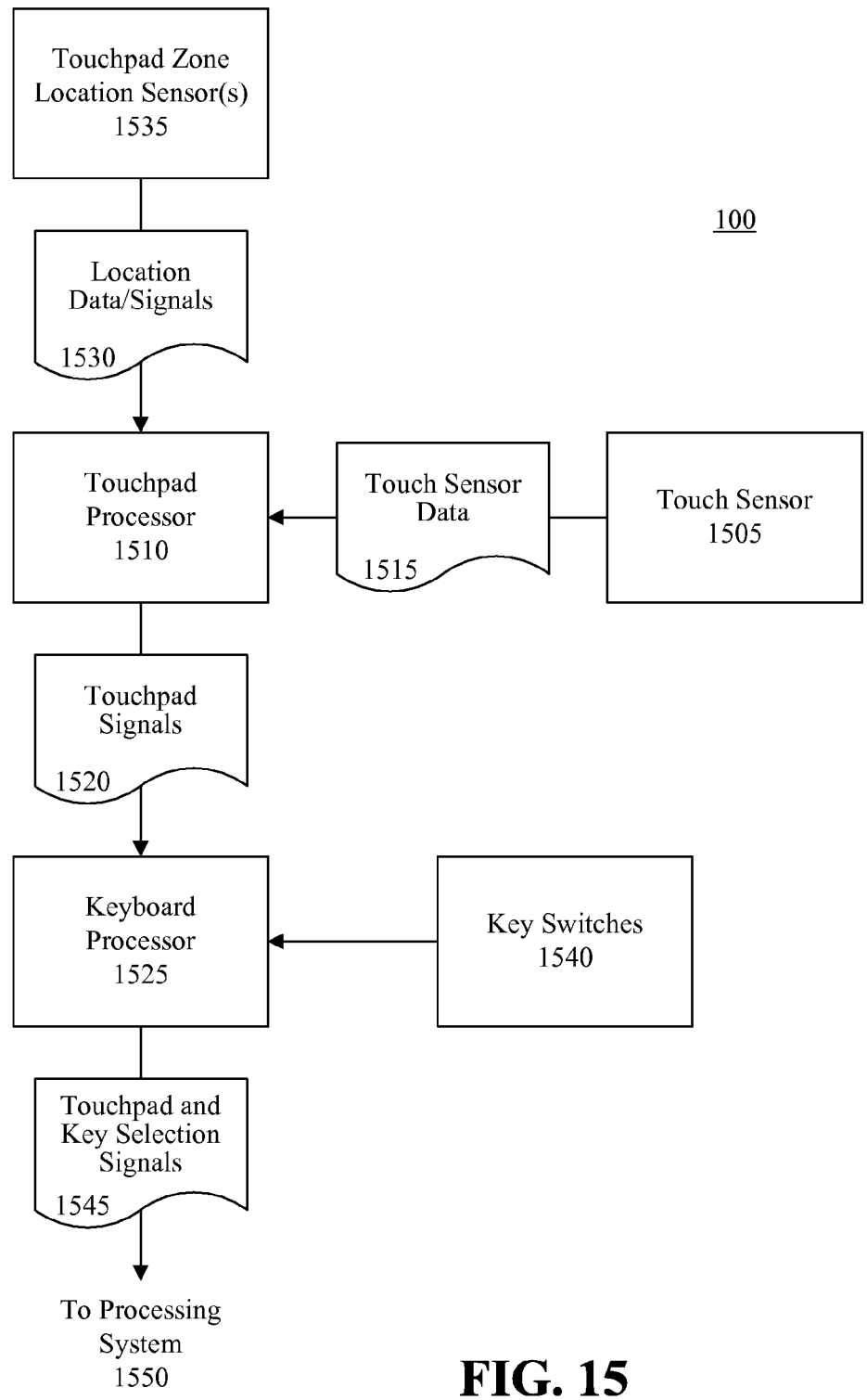
FIG. 15 is a block diagram of a keyboard, which is useful for understanding various arrangements described herein.

FIG. 15 is a block diagram of the keyboard 100, which is useful for understanding various arrangements described herein. The keyboard 100 can include a touch sensor 1505, for example any of those previously described. Further, the keyboard 100 can include a touchpad processor 1510 (e.g., a controller) that receives touch sensor data 1515 from the touch sensor 1505.

The touchpad processor 1510 can process the touch sensor data 1515 to generate touchpad signals 1520. In one arrangement, the touchpad signals 1520 can be generated in a serial format, thus minimizing the number of conductors used to communicate the touchpad signals 1520 to a keyboard processor 1525 (e.g., a controller), though the invention is not limited in this regard. Further, in an arrangement in which a touchpad zone is defined on the spacebar, the touchpad processor 1510 can receive location data/signals 1530 from touchpad zone location sensor(s) 1535 and/or the touch sensor 1505 to define the touchpad zone, for example as previously described. The touchpad processor 1510 can be integrated into the spacebar or elsewhere in the keyboard 100. In an arrangement in which the keyboard includes a touchpad, the processor 1510 also may be integrated into the touchpad.

The keyboard processor 1525 can receive the touchpad signals 1520. Further, the keyboard processor 1525 can poll key switches 1540 to identify keys that are being depressed. The keyboard processor 1525 can process data generated from the key polling and the touchpad signals 1520 to generate touchpad and key selection signals 1545, which the keyboard processor 1525 can communicate to a processing system 1550, such as a computer. The touchpad signals can cause corresponding movement of a cursor presented on a display attached to, or integrated with, the processing system 1550. The touchpad signals also can initiate other programmatic actions. The keyboard processor may be integrated into the spacebar or elsewhere in the keyboard 100, or to another system to which the keyboard 100 is communicatively linked.

The touchpad processor 1510 and keyboard processor 1525 each can include memory, or can be communicatively linked to memory (not shown). Such memory can store suitable computer-readable program code executed by the respective processors 1510, 1525 to implement the functions and processes described herein. Examples of memory include, but are not limited to, read-only memory (ROM), erasable programmable read-only memory (EPROM or Flash memory), and other suitable data storage devices.

Further, it should be noted that a single processor can be used in place of the individual touchpad processor 1510 and keyboard processor 1525. Such a processor can receive the touch sensor data 1515 and location data/signals, and poll the key switches. The processor further can generate the touchpad signals 1520, and the combined touchpad and key selection signals 1545. Such a processor can be integrated into the spacebar, touchpad, elsewhere in the keyboard 100, or to another system to which the keyboard 100 is communicatively linked.

Notably, the touch sensor 1505, touchpad processor 1510, keyboard processor 1525 and touchpad zone location sensors 1535 can receive power from the processing system 1550 to which the keyboard 100 is connected. For example, the components can receive energy from drive signals provided by the processing system 1550 for the keyboard's scan matrix. Accordingly, a dedicated power source for the keyboard 100 need not be required.

FIG. 16 is a flowchart depicting a method 1600 of generating touchpad and key selection signals, which is useful for understanding various arrangements described herein. At step 1602, least one location corresponding to a touchpad zone defining structure with respect to the spacebar can be detected. The spacebar can be configured to receive a user input depressing the spacebar to generate a corresponding first signal from the keyboard. Detecting the at least one location can include identifying a location of a first fence or a first marker on the spacebar, and identifying a location of a second fence or marker on the spacebar.

At step 1604, based on the at least one location, the touchpad zone can be defined to be a portion of a planar surface of the spacebar. The portion of the planar surface can be a portion of the planar surface between the first fence or marker and the second fence or marker. A surface area of the portion of the planar surface is less than a surface area of an entirety of the planar surface of the spacebar. The touchpad zone can be configured to detect movement of a human appendage across the touchpad zone, or above the touchpad zone (e.g., a gesture), and generate a corresponding second signal from the keyboard that causes corresponding movement of a cursor presented on a display.

At step 1606, touch or gesture sensing capability of the spacebar can be deactivated in regions outside of the touchpad zone.

The flowchart and block diagram in the figures illustrate the architecture, functionality, and operation of possible implementations of systems, methods and computer program products according to various embodiments described herein. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present embodiments can be realized in hardware, or a combination of hardware and software. The present embodiments can be realized in a centralized fashion in one processor or in a distributed fashion where different elements are spread across several interconnected processors. Any kind of processor or other apparatus adapted for carrying out the methods described herein is suited. A typical combination of hardware and software can be a processor and memory having computer-readable (or computer-usable) program code that, when being loaded and executed by at least one processor, controls the processor such that it carries out the methods described herein.

The term "program code," in the present context, means any expression, in any language, code or notation, of a set of instructions intended to cause a system having an information processing capability to perform a particular function either directly or after either or both of the following: a) conversion to another language, code or notation; b) reproduction in a different material form. The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one sensor, object, region, location, portion or the like from another sensor, object, region, location, portion or the like. Thus, an ordinal term used herein need not indicate a specific position in an ordinal series.

These embodiments can be embodied in other forms without departing from the spirit or essential attributes thereof. Accordingly, reference should be made to the following claims, rather than to the foregoing specification, as indicating the scope of the embodiments.

What is claimed is:

1. A keyboard comprising:
   a spacebar configured to receive a user input depressing the spacebar to generate a corresponding first signal from the keyboard, the spacebar comprising a touchpad zone defined on a portion of a planar surface of the spacebar, a surface area of the portion of the planar surface being less than a surface area of an entirety of the planar surface of the spacebar, wherein movement of a human appendage across the touchpad zone is detected, and a corresponding second signal is generated from the keyboard that causes corresponding movement of a cursor presented on a display.

2. The keyboard of claim 1, wherein movement of a human appendage across the spacebar outside the touchpad zone is not detected to generate the corresponding second signal.

3. The keyboard of claim 1, further comprising:
   at least one touchpad zone defining structure slidably engaged to the keyboard and disposed proximate to the planar surface of the spacebar, the touchpad zone defining structure defining the portion of the planar surface on which the touchpad zone is defined.

4. The keyboard of claim 3, wherein the touchpad zone defining structure comprises:
   a first fence substantially perpendicular to a long side of the spacebar; and
   a second fence substantially perpendicular to the long side of the spacebar and offset from the first fence;
   wherein the keyboard detects respective locations of the first fence and the second fence with respect to the spacebar, and identifies the touchpad zone as being a portion of the planar surface having a first side defined by the first fence and a second side defined by the second fence.

5. The keyboard of claim 4, wherein the first fence and the second fence each slidably engage the keyboard, and the respective locations of the first fence and the second fence with respect to the spacebar are user selectable.

6. The keyboard of claim 4, further comprising:
   at least one cross member that connects the first fence to the second fence, the cross member providing a fixed distance between the first fence and the second fence.

7. The keyboard of claim 4, wherein:
   the first fence comprises at least a first locating pad that touches the planar surface of the spacebar;
   the second fence comprises at least a second locating pad that touches the planar surface of the spacebar; and
   the keyboard detects respective locations of the first fence and the second fence with respect to the spacebar by identifying where the first and second locating pads touch the planar surface of the spacebar.

8. The keyboard of claim 4, wherein:
   the first fence comprises a first locating bar that closes an electrical connection between a first portion of a first sensor and a first portion of a second sensor;
   the second fence comprises a second locating bar that closes an electrical connection between a second portion of the first sensor and a second portion of the second sensor; and
   the keyboard detects respective locations of the first fence and the second fence with respect to the spacebar by identifying the first and second locations of the first and second sensors.

9. The keyboard of claim 3, wherein the touchpad zone defining structure comprises:
   a touch cover disposed over the touchpad zone, the touch cover comprising graphics disposed thereon indicating various regions of the touchpad zone.

10. The keyboard of claim 3, wherein the touchpad zone defining structure comprises:
    a first marker proximate to a first long side of the spacebar and slidably engaged to the keyboard; and
    a second marker proximate to the first long side of the spacebar or a second long side of the spacebar, slidably engaged to the keyboard, and offset from the first marker;
    wherein the keyboard detects respective locations of the first marker and the second marker with respect to the spacebar, and identifies the touchpad zone as being a portion of the planar surface having a first side defined by the first marker and a second side defined by the second marker.

11. The keyboard of claim 10, wherein the first marker and the second marker individually slidably engage the keyboard, and respective locations of the first marker and the second marker with respect to the spacebar are user selectable.

12. The keyboard of claim 10, further comprising:
at least one cross member that connects the first marker to the second marker, the cross member providing a fixed distance between the first marker and the second marker.

13. The keyboard of claim 1, further comprising:
an optical navigation module disposed under the planar surface of the spacebar, the optical navigation module configured to detect movement of a human appendage across the touchpad zone by transmitting infrared light through the spacebar and detecting the infrared light scattering off of the human appendage; and
the planar surface of the spacebar comprises a material that is transparent to infrared light.

14. The keyboard of claim 13, wherein:
wherein the optical navigation module projects at least one image onto the planar surface of the spacebar visible to the user that designates a perimeter of the touchpad zone.

15. The keyboard of claim 13, wherein the optical navigation module comprises a light guide illuminated by a light source, the light guide indicating the touchpad zone.

16. The keyboard of claim 1, further comprising a bistable display on, or within, the planar surface of the space bar to denote the touchpad zone.

17. The keyboard of claim 1, wherein the touchpad zone is activated responsive to a user selection of a particular key of the keyboard or a particular user gesture, further comprising:
indicating whether the touchpad zone is activated via an indicator on the keyboard or a message provided by a processing system to which the keyboard is attached.

18. The keyboard of claim 1, further comprising:
at least a first processor configured to receive the second signal, process the second signal to generate a third signal, and communicate the third signal to a second processor of a processing system to which the keyboard is communicatively linked.

19. The keyboard of claim 1, further comprising:
an actuator that prevents the spacebar from moving into a depressed position when the user touches the spacebar in the touchpad zone, while allowing the spacebar to move into the depressed position when the user touches the spacebar outside of the touchpad zone.

20. A keyboard comprising:
a spacebar configured to receive a user input depressing the spacebar to generate a corresponding first signal from the keyboard; and
a touchpad positioned over the spacebar, the touchpad slidably engaged to the keyboard to facilitate user positioning of the touchpad over a desired portion of the spacebar, the touchpad configured to detect movement of a human appendage across the touchpad or above the touchpad and generate a corresponding second signal from the keyboard that causes corresponding movement of a cursor presented on a display.

21. The keyboard of claim 20, further comprising:
a flexible cable comprising a plurality of electrical conductors communicatively linking the touchpad to a processor.

22. The keyboard of claim 20, the touchpad comprising:
a plurality of electrical contacts that slidably engage the keyboard, the electrical contacts communicatively linking the touchpad to a processor.

23. The keyboard of claim 20, wherein the touchpad is slidably engaged to the spacebar.

24. The keyboard of claim 23, the touchpad comprising:
a plurality of electrical contacts that slidably engage the spacebar, the electrical contacts communicatively linking the touchpad to a processor.

25. The keyboard of claim 20, further comprising:
an actuator that prevents the spacebar from moving into a depressed position when the user touches the spacebar in the touchpad zone, while allowing the spacebar to move into the depressed position when the user touches the spacebar outside of the touchpad zone.

26. A method of defining a touchpad zone on a spacebar of a keyboard, comprising:
detecting at least one location corresponding to a touchpad zone defining structure with respect to the spacebar, the spacebar configured to receive a user input depressing the spacebar to generate a corresponding first signal from the keyboard; and
based on the at least one location, defining the touchpad zone to be a portion of a planar surface of the spacebar, a surface area of the portion of the planar surface being less than a surface area of an entirety of the planar surface of the spacebar, a surface area of the portion of the planar surface being less than a surface area of an entirety of the planar surface of the spacebar, wherein movement of a human appendage across the touchpad zone is detected, and a corresponding second signal is generated from the keyboard that causes corresponding movement of a cursor presented on a display.

27. The method of claim 26, further comprising:
deactivating touch or gesture sensing capability of the spacebar in regions outside of the touchpad zone.

28. The method of claim 26, wherein:
detecting the at least one location corresponding to the touchpad zone defining structure comprises:
identifying a location of a first fence on the spacebar;
identifying a location of a second fence on the spacebar; and
defining the touchpad zone to be the portion of the planar surface of the spacebar comprises:
defining the touchpad zone to be a portion of the planar surface between the first fence and the second fence.

29. The method of claim 26, wherein:
detecting the at least one location corresponding to the touchpad zone defining structure comprises:
identifying a location of a first marker on the spacebar;
identifying a location of a second marker on the spacebar; and
defining the touchpad zone to be the portion of the planar surface of the spacebar comprises:
defining the touchpad zone to be a portion of the planar surface between the first marker and the second marker.

* * * * *